UNITED STATES PATENT OFFICE.

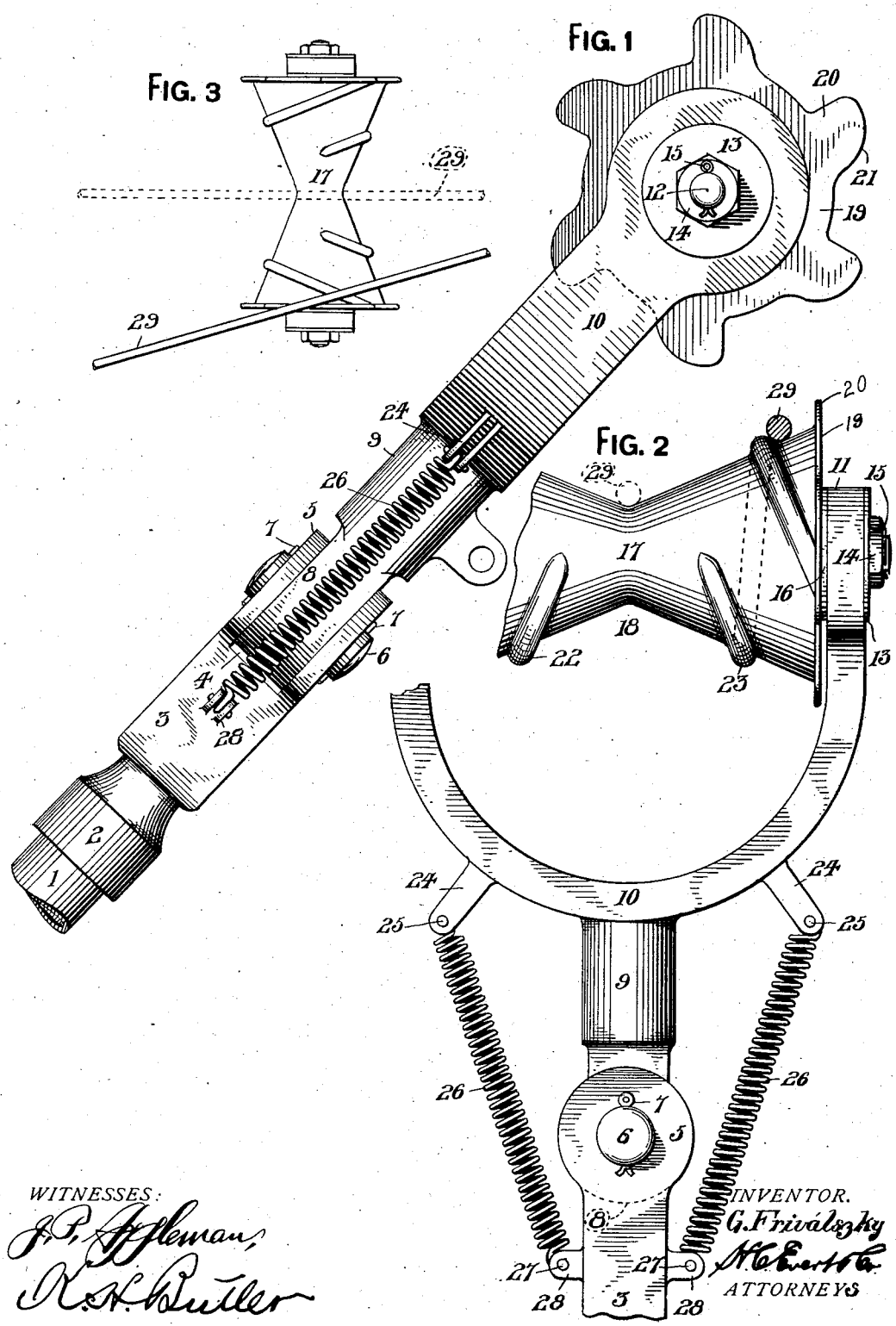

GUSZTAV FRIVÁLSZKY, OF CHICAGO, ILLINOIS.

TROLLEY.

1,010,889.  Specification of Letters Patent.  Patented Dec. 5, 1911.

Application filed June 10, 1911. Serial No. 632,309.

*To all whom it may concern:*

Be it known that I, GUSZTAV FRIVÁLSZKY, a subject of the King of Hungary, residing at Chicago, in the county of Cook and State of Illinois, have invented certain new and useful Improvements in Trolleys, of which the following is a specification, reference being had therein to the accompanying drawing.

This invention relates to trolleys, and the objects of my invention are:—First, to furnish a trolley pole with a pivoted harp having a revoluble trolley wheel that is normally maintained in the vertical plane of a trolley pole by retractile springs connecting the pole and the harp, whereby the trolley wheel can readily adjust itself to a curved section of trolley wire. Second, to provide a trolley harp with a wide wheel having devices adapted to facilitate the placing of the wheel in engagement with a trolley wire and the retaining of said wheel upon the wire. Third, to provide a harp and wheel that can be advantageously used upon high speed suburban railways where curved sections of track, heavy grades and irregularities are encountered that often cause the displacement of a trolley wheel relative to the wire. Fourth, to provide a trolley harp and wheel that are simple in construction, easy to install and maintain in an operatable condition.

I attain the above objects by a mechanical construction that will be hereinafter specifically described and then claimed, and reference will now be had to the drawing, wherein:—

Figure 1 is a side elevation of the trolley, Fig. 2 is a front elevation of the same, partly broken away, and Fig. 3 is a plan of the trolley upon a reduced scale, illustrating the manner in which the wheel rides into engagement with the trolley wire.

The reference numeral 1 denotes a portion of a trolley pole and mounted upon the upper end of the pole is a socket 2 having a bearing member 3 which is rectangular in cross section. The upper end of this member is bifurcated, as at 4 to provide oppositely disposed arms 5 and these arms are apertured to receive a pivot pin 6, which is retained within the apertured arms by cotter pins 7 mounted in the ends of the pin 6.

Pivotally mounted upon the pin 6 between the arms 5 is the lower reduced and flattened end 8 of the shank 9 of a harp 10. The harp 10 is substantially circular in elevation and has the upper end thereof enlarged, as at 11 and apertured to receive a journal pin 12. The journal pin 12 is retained in the harp by washers 13 arranged upon the outer ends of the pin, nuts 14 screwed upon the ends of the pin, and cotter pins 15 mounted in the ends of the pin.

Arranged upon the pin 12 are washers 16 and revolubly mounted upon the pin between the washers is a wide trolley wheel 17. This wheel has a wide annular groove 18 V-shaped in cross section, said wheel having a formation as though two frusto-conical shaped sections were connected together with the small ends thereof abutting. The ends of the wheel are provided with heads 19 and the periphery of each head has a plurality of equally spaced radially disposed projections 20, each projection having the outer end thereof beveled, as at 21. The periphery of the wheel 17 is provided with two spirally arranged beads 22 and 23, said beads having the inner convolutions thereof terminating at a point removed from the bottom of the groove 18 and the outer convolutions terminating at the inner sides of the heads 19.

The harp 10 at diametrically opposed sides of the shank 9 is provided with arms 24, these arms being disposed at a radius having the same center as the curve upon which the harp is described. The lower ends of the arms 24 are apertured and connected to said arms are the upper ends 25 of coiled retractile springs 26, these springs having the lower ends 27 thereof connected to apertured lugs 28, carried by oppositely disposed faces of the bearing member 3. These springs are of equal tension and are adapted to normally maintain the shank 9 in longitudinal alinement with the bearing member 3 and the pole 1, whereby the harp 10 will be properly positioned to retain the bottom of the groove 18 in engagement with a trolley wire 29.

It is a well known fact that on a straight section of track, the trolley wire is supported centrally of the rails of the track, and the wheel is normally maintained in alinement with the pole by the springs of the harp, whereby the wheel can easily travel upon the wire, but when curved sections of track are encountered, the trolley wire is often positioned in a vertical plane closer to the inner rail of the track than to the outer rail, consequently it is necessary for the harp to tilt in a direction toward the inner rail of the curve, whereby the wheel will be normally maintained in engagement with the trolley wire.

Should the trolley wire 29 have a tendency to ride off of the wheel toward either of the heads 19, one of the spiral beads 22 or 23 will cause said wire to ride back into the bottom of the groove 18. The projections 20 of the heads 19 prevent the trolley wheel from riding off the wire 29.

What I claim is:—

In a trolley, a harp, a journal pin carried by said harp, a wide trolley wheel revolubly mounted upon said pin and having an annular groove V-shaped in cross section, heads carried by the ends of said wheel, radially disposed equally spaced projections carried by said heads, and spirally arranged beads carried by the periphery of said wheel at each side of the center thereof and having the inner convolutions terminating at a point removed from the bottom of the groove of said wheel and the outer convolutions terminating at the inner sides of said heads.

In testimony whereof I affix my signature in the presence of two witnesses.

GUSZTAV FRIVÁLSZKY.

Witnesses:
JOSEF TAIFER,
LEJFAR ALAJOS.

Copies of this patent may be obtained for five cents each, by addressing the "Commissioner of Patents, Washington, D. C."